United States Patent
Bamonte et al.

(10) Patent No.: US 11,603,251 B2
(45) Date of Patent: Mar. 14, 2023

(54) VACUUM SEALED CONTAINER FOR PERISHABLE AND NON-PERISHABLE GOODS

(71) Applicants: Erika Bamonte, Howell, NJ (US); April Bamonte, Howell, NJ (US)

(72) Inventors: Erika Bamonte, Howell, NJ (US); April Bamonte, Howell, NJ (US)

(*) Notice: Subject to any disclaimer, the term of this patent is extended or adjusted under 35 U.S.C. 154(b) by 0 days.

(21) Appl. No.: 16/809,533

(22) Filed: Mar. 4, 2020

(65) Prior Publication Data
US 2021/0276783 A1    Sep. 9, 2021

(51) Int. Cl.
| B65D 81/20 | (2006.01) |
| B65D 85/60 | (2006.01) |
| B65D 51/24 | (2006.01) |
| B65B 31/02 | (2006.01) |
| B65B 31/00 | (2006.01) |
| B65B 31/04 | (2006.01) |

(52) U.S. Cl.
CPC .......... *B65D 81/2038* (2013.01); *B65B 31/00* (2013.01); *B65B 31/02* (2013.01); *B65B 31/04* (2013.01); *B65D 51/24* (2013.01); *B65D 81/2015* (2013.01); *B65D 85/60* (2013.01)

(58) Field of Classification Search
CPC ............ B65D 81/2038; B65D 81/2015; B65D 85/60; B65D 51/24; B65B 31/00; B65B 31/02; B65B 31/025; B65B 31/028; B65B 31/04; B65B 25/001; A47J 47/10; A47J 47/02; A47J 47/12
USPC ................... 141/8, 65, 83, 94–95; 220/231; 215/262; 53/432, 510; 99/472; 206/524.8, 543–544
See application file for complete search history.

(56) References Cited

U.S. PATENT DOCUMENTS

| 3,943,987 | A | * | 3/1976 | Rossi | B65D 81/2015 |
| | | | | | 206/524.8 |
| 5,570,628 | A | * | 11/1996 | Kiener | A45C 11/20 |
| | | | | | 99/467 |
| 5,806,575 | A | * | 9/1998 | Tsay | B65D 81/2015 |
| | | | | | 141/192 |
| 5,964,255 | A | * | 10/1999 | Schmidt | B65B 31/047 |
| | | | | | 141/65 |
| 6,725,632 | B2 | * | 4/2004 | Glucksman | B65B 31/028 |
| | | | | | 251/251 |
| 6,968,870 | B1 | * | 11/2005 | Tsay | B65B 31/047 |
| | | | | | 141/65 |
| 7,246,555 | B2 | * | 7/2007 | Small | A23L 3/0155 |
| | | | | | 141/65 |
| 7,571,748 | B2 | * | 8/2009 | Shao | B65B 31/00 |
| | | | | | 141/65 |
| 7,677,166 | B2 | * | 3/2010 | Tsai | A47J 47/10 |
| | | | | | 99/472 |

(Continued)

*Primary Examiner* — Chun Hoi Cheung
*Assistant Examiner* — Brijesh V. Patel

(57) ABSTRACT

An inventive vacuum storage container for long term storage of perishable and non-perishable items, incorporating a pump, power supply, controller, sensor, top cover, expandable seal, pressure sensor and base plate. The controller activates the pump based on signals from the sensor to maintain a vacuum state within an interior vacuum chamber formed by the top cover, expandable seal, and base plate. The container is configured to effectively maintain vacuum pressure by activating a pump when the lack of vacuum pressure is indicated.

1 Claim, 3 Drawing Sheets

(56) References Cited

U.S. PATENT DOCUMENTS

| | | | | |
|---|---|---|---|---|
| 7,721,771 | B2* | 5/2010 | Tsay | B01J 3/006 |
| | | | | 141/65 |
| 7,743,796 | B1* | 6/2010 | Schooley | B65D 81/2038 |
| | | | | 141/65 |
| 7,931,052 | B2* | 4/2011 | Schooley | B65D 81/2015 |
| | | | | 141/65 |
| 8,113,246 | B2* | 2/2012 | Hsieh | E21B 47/007 |
| | | | | 73/152.48 |
| 9,038,452 | B2* | 5/2015 | Lee | E21B 47/007 |
| | | | | 73/152.48 |
| 9,359,121 | B1* | 6/2016 | Hsieh | B65B 31/00 |
| 2004/0099332 | A1* | 5/2004 | Kieck | A47J 47/10 |
| | | | | 141/65 |
| 2007/0215510 | A1* | 9/2007 | Sung | B65D 79/005 |
| | | | | 206/524.8 |
| 2009/0020540 | A1* | 1/2009 | Vovan | A47G 19/26 |
| | | | | 220/780 |
| 2018/0111741 | A1* | 4/2018 | Kwok | A47J 47/10 |
| 2018/0273274 | A1* | 9/2018 | Ho | A47J 47/10 |
| 2019/0084749 | A1* | 3/2019 | Lapidot | A47J 47/02 |
| 2019/0210786 | A1* | 7/2019 | Hsu | B65D 81/2015 |
| 2019/0248563 | A1* | 8/2019 | Ho | B65D 53/02 |
| 2020/0087012 | A1* | 3/2020 | Nguyen | B65B 31/02 |

\* cited by examiner

VACUUM SEALED CONTAINER FOR PERISHABLE AND NON-PERISHABLE GOODS

CROSS REFERENCE TO PRIORITY

This application claims priority to U.S. patent application Ser. No. 16/143,417, filed on Sep. 26, 2018. The disclosures of the prior application are incorporated by reference herein in its entirety.

FIELD OF THE INVENTION

The present invention relates to a container and base incorporating a pump, expandable seal, pressure sensor and power supply for the purpose of creating and maintaining a vacuum cavity within which to store items. The invention may be used to store various types of goods needing to be preserved within a vacuum, including both perishable and non-perishable items. Byway of example, the invention may be used to preserve a food item.

BACKGROUND OF THE INVENTION

Vacuum containers for storing perishable items are relatively common. These containers can be used to preserve the freshness or integrity of an item for use at a later date. For example, many people attempt to preserve food so that it can be safely eaten over an extended period of time. A vacuum storage container may be used in an attempt to an item fresh and safe to eat for days or even longer. However, typical vacuum storage containers lose their effectiveness over time. Therefore, there is a need for a vacuum storage container that will maintain effective vacuum pressure over extended periods of time.

One prior art method of storing perishable and non-perishable goods for long periods is to simply wrap them up in a substance such as plastic wrap or aluminum foil and to place them in a freezer. This is most common for baked goods. This serves the purpose of limiting the growth of bacteria and fungi on the baked good but leads to several problems. First, the unsealed wrap leads to freezer burn, which is caused by dehydration and oxidization due to air reaching the item, rendering the item unpalatable. Second, baked goods often contain high proportions of fatty ingredients such as butter. These fatty ingredients help to create the appealing flavor of the item, but also have a tendency to absorb other odors if exposed to them. Given that many refrigerators recycle the air between the refrigerated section and the freezer section, this can lead to the transfer of unwelcome flavors and aromas, such as those from anions and garlic, to the baked good.

The need to preserve food items over long periods of time has given rise to several preservation methods, ranging from canning to pickling. However, none of these methods are suitable for the long term storage of perishable items such as baked goods. The only suitable method is to create a vacuum sealed cavity within which to the item. The creation of the vacuum occurs as atmosphere is removed from the cavity. This helps prevent the growth of bacteria and fungi, as well as preventing the evaporation of water and other volatile compounds which lend the baked goods their aroma, flavor, and moist texture. Furthermore, these baked goods we often stored in freezers for lengthy periods, which tends to result in the transfer of other undesirable aromas and flavors to the baked goods. By storing the baked goods inside a vacuum cavity, these problems can be solved.

Numerous forms of vacuum bags have been produced in order to overcome the problems of odor absorption and freezer burn. However, these create problems specific to the storage of baked goods. These types of items contain large volumes of air as a result of the baking process. Using a vacuum sealed bag removes the air, which is desirable, but causes the flexible container to collapse around the baked item, causing the compression of the baked good into a dense and undesirable lump.

One solution to the problem of compressing the item is to incorporate a ridged container. However, the rigid prior art products suffer from one of two problems arising from the fact that they come in one of only two configurations. The first configuration is a canister shape with a top containing a vacuum seal. The second configuration has a lid on the bottom, but with a dome shaped cover and vacuum pump attached. In the first configuration there is a problem arising from having to lower a cake down into a container, potentially marring the delicate outer covering of the cake from contact with the side walls of the container. In the second configuration the problem of the bulkiness of having the vacuum pump built into the top of the container exists. Furthermore, the prior art does not address the problem of maintaining a vacuum for extended periods of time. After a sufficient period of time, outside atmosphere tends to leak past any seals set up to maintain vacuum, resulting outside air entering into the vacuum sealed cavity causing the evaporation of water and bringing outside aromas and flavors.

While these solutions solve some of the problems associated with long term storage of baked goods, none of them provide a compact storage solution which protects against freezer burn, bacterial and fingi growth, and odor absorption, maintaining the vacuum sealed cavity for extended periods of time and eventually resulting in outside atmosphere entering the vacuum sealed cavity, resulting in the very problems with the vacuum sealed cavity is designed to prevent.

SUMMARY OF THE INVENTION

A vacuum sealed container comprising a top cover with a vacuum valve, a base plate incorporating a pump for creating a vacuum within the vacuum chamber, an expandable seal, a power supply for operating the pump, a sensor for detecting pressure levels within the vacuum chamber, a controller for automatically activating the pump to maintain a vacuum level within the vacuum chamber, and a switch for activating the controller to maintain the vacuum level within the vacuum chamber is disclosed. When the top cover engages the base plate and expandable seal, a vacuum chamber is formed. When the switch is activated and the top cover is engaged to the base plate and expandable seal, the controller activates a sensor which measures the pressure levels within the vacuum chamber. If the signal from the sensor indicates that a vacuum has not been formed within the vacuum chamber, the controller applies power to the pump to remove atmosphere from the vacuum chamber so as to form a vacuum within the vacuum chamber. Once sufficient atmosphere has been removed the sensor sends a signal indicating this to the controller which deactivates the pump. Provided the power is maintained, the sensor continually monitors the pressure levels within the vacuum chamber and signals the controller to activate the pump periodically to maintain a vacuum state within the vacuum chamber.

By providing a vacuum sealed chamber with a sensor, controller, and pump, baked goods may be stored within the vacuum chamber to maintain their freshness and appeal for extended lengths of time not otherwise possible with prior art containers.

Furthermore, an expandable seal is placed within a recess on top of the base contacts bottom edge of the top cover. The expandable seal is situated so that when a vacuum is created within the vacuum chamber, the expandable plate contacts the bottom edge of the side walls of the top cover so as to form a barrier to stop the ingress or egress of gases, thus aiding in forming a vacuum.

In an alternate embodiment the expandable seal consists of an expandable plate placed on top surface of the base plate and extends laterally to contact the interior portion of the sidewalls of the top cover so as to form a seal.

The top cover and base plate may be cylindrical, rectangular, or any other three-dimensional shape suitable for storing baked goods. On the top surface of the top cover is a vacuum valve. The valve may be connected to a vacuum pump for the removal of gasses from inside of the vacuum chamber formed by the top cover, base plate, and expandable seal. Additionally, the valve may be located on the side of the top cover or located on the side of the base plate.

The base plate is preferably made of BPA a free plastic, but could be made of other materials including glass, ceramic, metal, or any other ridged and non-hazardous material. The outer edge of the top surface of the base plate is beveled. The base plate is sized to be slightly larger than the bottom edge of the top cover so that the base edges overhang slightly. Additionally, the base plate edge contains a lip that angles up, having a bottom edge that so that the interior edge of the base lip contacts the exterior edge of the top cover. Furthermore, the lip serves to keep the baked good from contacting the interior surfaces of the cylindrical container.

In one embodiment the base plate includes a cavity on the bottom side of the base plate. The cavity is sized so as to allow placing within it two or more contacts for connecting with one or more electrical batteries to provide power.

In an alternate embodiment, the base plate includes one or more cavities placed on the side portion. The one or more cavities are sized to contain an electrical connector for accepting an AC power source.

In one embodiment the base plate contains an apparatus for creating and maintaining a vacuum within the vacuum chamber. The apparatus for maintaining a vacuum consists of a pump for removing the air from the vacuum chamber, a power supply connected to the pump for providing electrical power to the pump, a sensor for detecting the atmosphere levels within the vacuum chamber, a power switch for turning the apparatus on and off, and a controller for receiving signals from the power switch and the sensor and activating the pump to create and maintain a vacuum based on signals received from the sensor.

In a further embodiment, the sensor consists of a diaphragm made from a deformable material which is placed in a recess in the base forming a barrier between the vacuum chamber and the exterior atmosphere. As the level of pressure differential increases or decreases between the vacuum chamber and the outside atmosphere, the diaphragm expands or contracts. A switch adjacent to the diaphragm is pressed by the diaphragm as it expands to activate the pump and not activated when the diaphragm contacts. In this manner, when the pressure within the vacuum chamber is less than or equal to the desired pressure, the diaphragm expands towards the interior of the vacuum chamber and makes contact with the switch, thereby deactivating the pump. If the pressure within the vacuum chamber is greater than the desired pressure, the diaphragm retracts from within the vacuum chamber, thereby no longer making contact with the switch and activating the pump. The pump will thus remain activated until the pressure within the vacuum chamber reaches the desired levels, at which point the diaphragm will make contact with the switch, deactivating the pump. It will be readily apparent to one of ordinary skill in the art, that any number of configurations can be used to achieve the same effect, including placing the switch outside of the vacuum chamber and activating the pump when the switch is in contact with the diaphragm. Furthermore, an alternative means of sensing the pressure within the vacuum chamber to activate the pump to achieve the desired pressure levels can be used, such as a potentiometric pressure sensor, inductive pressure sensor, capacitive pressure sensor, piezoelectric pressure sensor, strain gage, or variable reluctance pressure sensor. In this embodiment, an efficient, passive pressure monitoring is employed. This eliminates the need for active monitoring which consumes energy and requires additional hardware to constantly, or at intervals, monitor the pressure.

In an alternative embodiment the base includes one or more clamping devices which are actuatable to engage with a lip place on the top cover to lock the top cover to the base plate.

BRIEF DESCRIPTION OF THE DRAWINGS

Embodiments of the invention will now be described, by way of example, with reference to the accompanying drawings, wherein.

DETAILED DESCRIPTION

Figure 1:
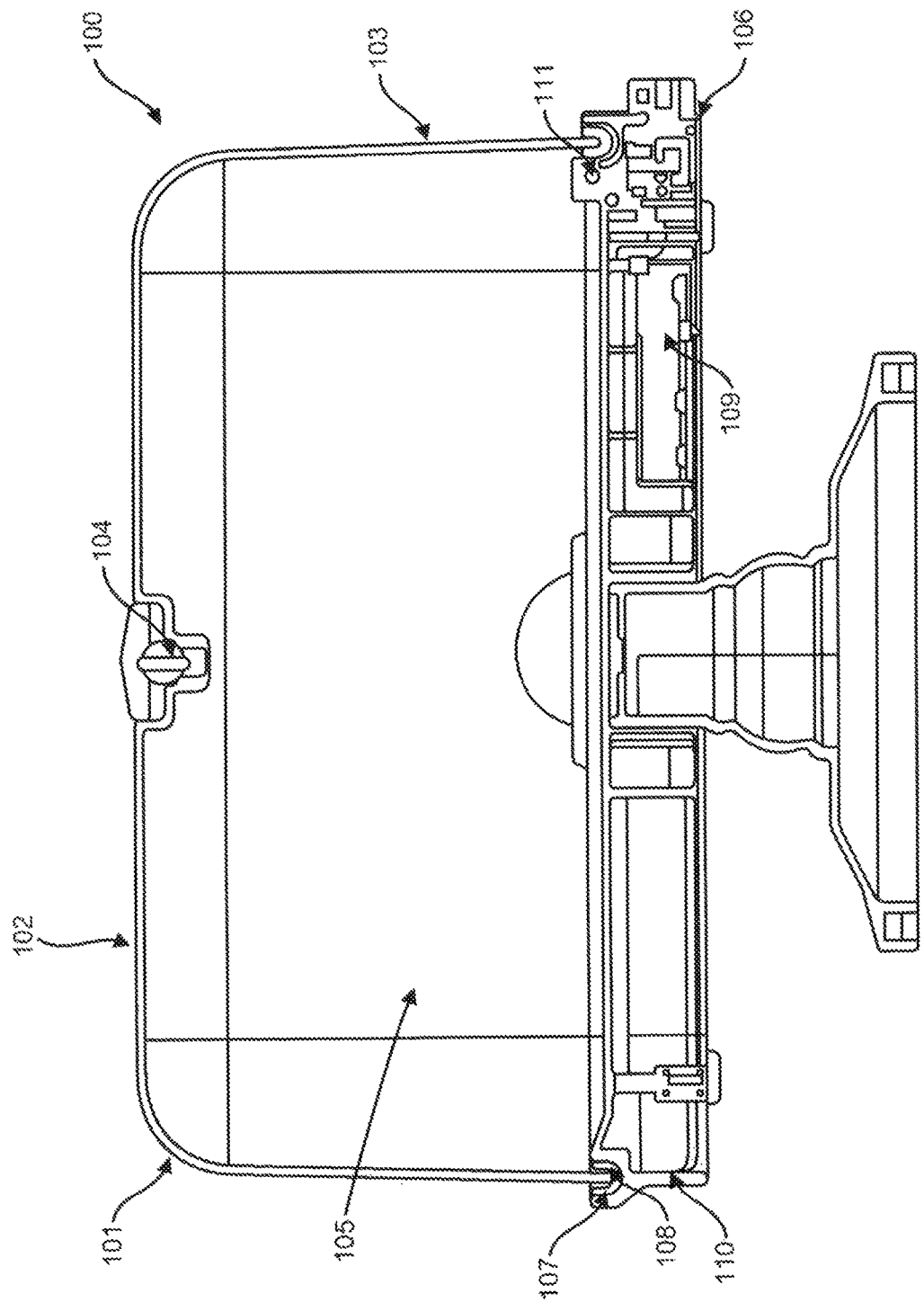
FIG. 1 shows the components of the preferred embodiment of the inventive vacuum sealed pastry saver.

FIG. 1 shows a preferred embodiment of the invention (100) having a top cover (101) with a top surface (102), at least one side wall extending laterally from the top surface (103), and a vacuum valve (104). The hollow interior of top cover (101) forms an interior cavity (105) when placed on base (106). Base (106) possesses atop surface with groove (107). Placed within the groove is expandable seal (108). Expandable seal (108) makes contact with said side wall of top cover (101) so as to form a seal with the interior cavity (105). Base (106) also includes a receptacle (109) for containing a power source, such as a battery pack, and plug receptacle (110) for connecting a power source. Valve (111) allows for the egress of atmospheric gases from interior cavity (105) so as to create a vacuum chamber.

Figure 2:
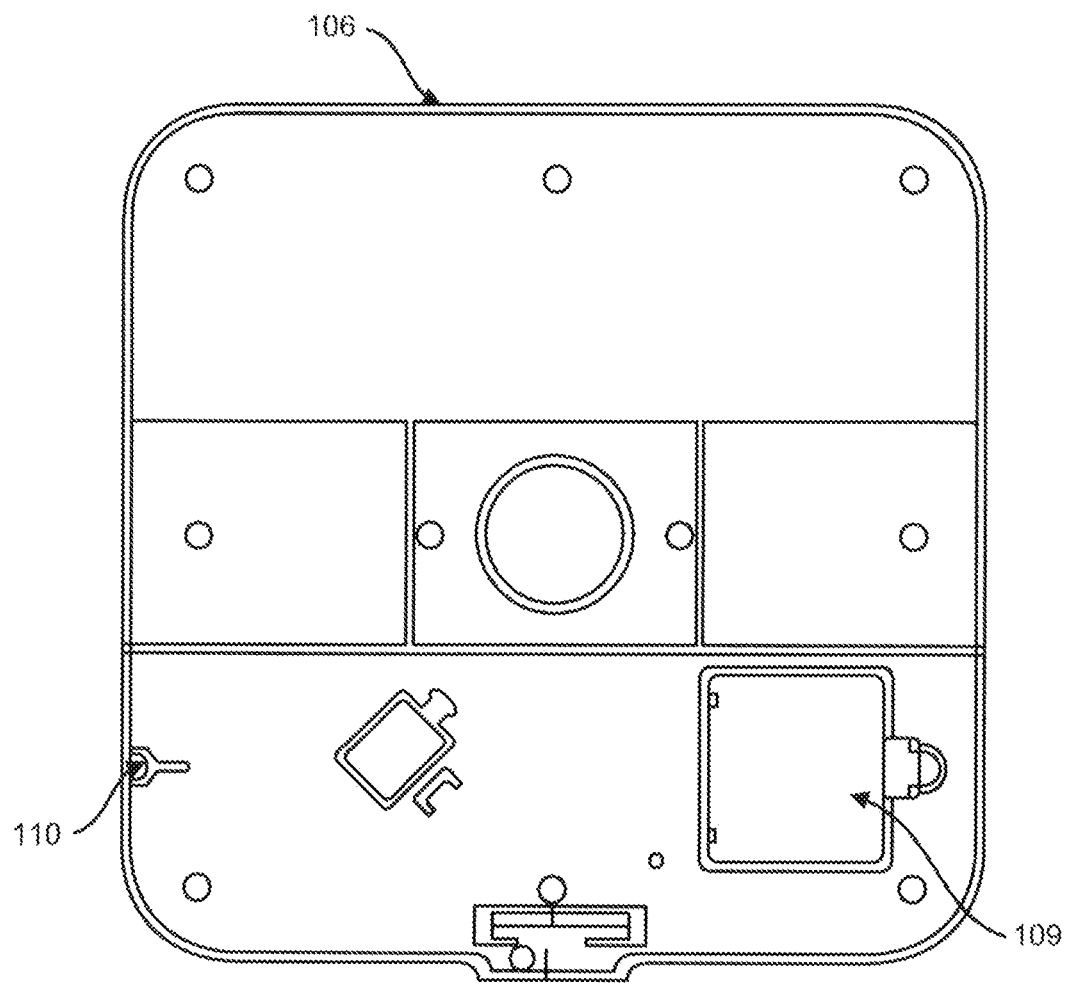
FIG. 2 shows the base.

FIG. 2 shows a bottom view of the bottom of the base (106). Also shown is receptable (109) for receiving the power source such as a battery pack, and plug receptacle (110) for connecting a power source.

Figure 3:
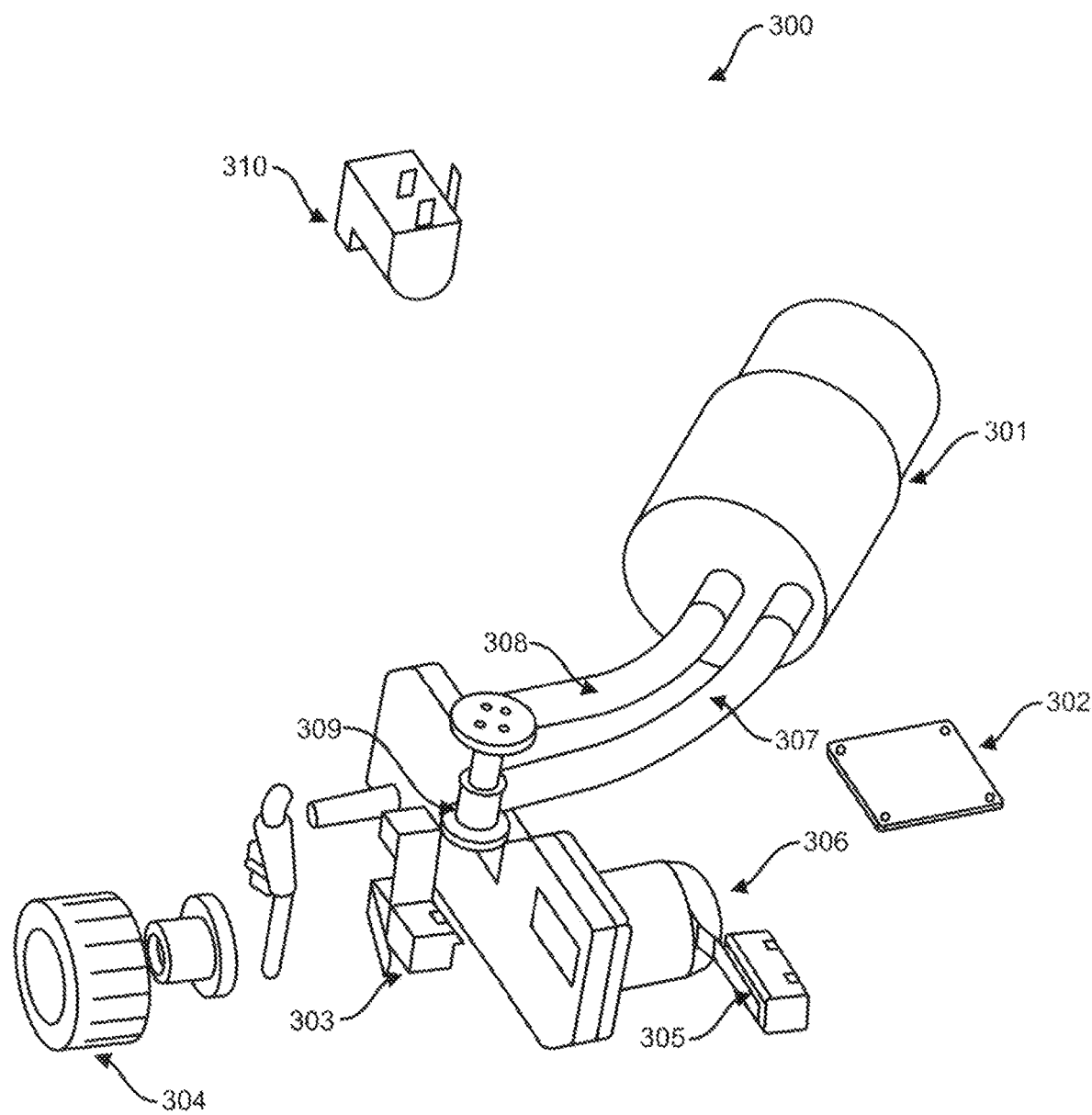
FIG. 3 shows the pump assembly with controller, power supply, and pump.

FIG. 3 shows an expanded view of the pump assembly (300) with pump (301), controller (302), a first power switch (303) activated by knob (304), a second power switch (305) activated by diaphragm (306), inlet (307), exhaust (308), and inlet valve (309). When the knob (304) is activated it actuates the first switch (303) such that controller (302) is provided with power. It will be readily understood by one of skill in the art that a number of switch designs could be used, such as a rocker switch. When power is provided to controller (302) it activates pump (301). Pump (301) is connected to inlet (307) which is in turn connected to inlet valve (309) which allows for the egress of atmospheric gases from sealed vacuum chamber. Pump (301) is also connected to exhaust (308) which allows pump to vent atmospheric gases. When turned on by controller (302), pump (301) draws atmospheric gases through inlet valve (309) and inlet (307) and expels said atmospheric gases via exhaust (308), thus removing the atmospheric gases from sealed vacuum chamber, thereby creating a vacuum within sealed vacuum chamber. Second power switch (305) rests against diaphragm (306). Diaphragm (306) is placed between the sealed vacuum chamber and the exterior atmosphere, such that diaphragm (306) extends towards the sealed vacuum chamber when the pressure inside the sealed vacuum chamber is substantially lower than the exterior atmospheric pressure, i.e., when a vacuum has been formed within sealed vacuum chamber, and extends away from sealed vacuum chamber when the pressure within sealed vacuum chamber is equal to or greater than the exterior atmospheric pressure. When the correct vacuum pressure has been achieved within sealed vacuum chamber, diaphragm (306) makes contact with and actuates second power switch (305). When second power switch (305) is actuated, it delivers a signal to controller (302) which turns off pump (301). In this manner, when the pressure levels in the sealed vacuum chamber rise due to the entry of atmospheric gases over time, the pump (301) can be automatically activated to man in the desired vacuum and automatically deactivated once the desired vacuum has been achieved. Further, power plug (310) is shown.

The invention claimed is:

1. A vacuum storage container for storing perishable items comprising:
   a detachable top cover with a flat top surface and one or more side walls extending vertically from said flat top surface downwards to a bottom edge, a valve placed upon the flat top surface;
   a base plate having a top surface, a bottom surface, and one or more side walls and comprising:
      a vacuum pump for creating a vacuum within a vacuum chamber formed within a cavity formed by the top cover and the base plate;
      a groove placed along the top surface of the base plate;
      an expandable seal placed within said groove for forming a seal against said bottom edge of said one or more side walls of said top cover;
      a power supply for providing power to said vacuum pump;
      a sensor mechanism for detecting pressure levels within said vacuum chamber;
      a controller for automatically regulating said vacuum pump to maintain said vacuum within said vacuum chamber;
      a switch for activating said controller to maintain said vacuum within said vacuum chamber;
      wherein said sensor mechanism comprises one of the following: an inductive pressure sensor or a variable reluctance pressure sensor.

\* \* \* \* \*